(12) United States Patent
Strandemo et al.

(10) Patent No.: US 12,311,745 B2
(45) Date of Patent: May 27, 2025

(54) DRIVE SHAFT ARRANGEMENT AND A VEHICLE COMPRISING SAID ARRANGEMENT

(71) Applicant: Polestar Performance AB, Gothenburg (SE)

(72) Inventors: Per Strandemo, Sävedalen (SE); Lars Stenvall, Ljungskile (SE)

(73) Assignee: Polestar Performance AB, Gothenburg (SE)

( * ) Notice: Subject to any disclaimer, the term of this patent is extended or adjusted under 35 U.S.C. 154(b) by 0 days.

(21) Appl. No.: 18/502,672

(22) Filed: Nov. 6, 2023

(65) Prior Publication Data
US 2024/0157788 A1    May 16, 2024

(30) Foreign Application Priority Data

Nov. 10, 2022  (EP) .................................. 22206536

(51) Int. Cl.
*B60K 1/00*    (2006.01)
*B60K 17/26*   (2006.01)
(Continued)

(52) U.S. Cl.
CPC .......... *B60K 1/00* (2013.01); *B60K 2001/001* (2013.01); *B60K 17/26* (2013.01); *B60K 23/06* (2013.01); *F16D 41/07* (2013.01)

(58) Field of Classification Search
CPC . F16D 41/06; F16D 41/064–36; B60K 17/26; B60K 17/3515; B60K 23/06; B60K 23/08–0808; B60K 1/00; B60K 2001/001
See application file for complete search history.

(56) References Cited

U.S. PATENT DOCUMENTS 5,269,399 A * 12/1993 Ito .......................... B60K 17/26
                                                        475/222
5,529,158 A *  6/1996 Itoh .................... B60K 17/3515
                                                        192/45.01
(Continued)

FOREIGN PATENT DOCUMENTS

DE    10 2015 112102 A1    1/2017
GB          2 540 860 A    2/2017
WO       2020/143954 A1    7/2020

OTHER PUBLICATIONS

European Search Report, EP appl. No. 22206536.9 ; Apr. 5, 2023.

*Primary Examiner* — Ernesto A Suarez
*Assistant Examiner* — James J Taylor, II
(74) *Attorney, Agent, or Firm* — Kilpatrick Townsend & Stockton LLP

(57) ABSTRACT

The disclosure relates to a drive shaft arrangement for an all-wheel drive electric vehicle, comprising a drive shaft arranged to transfer torque a drive shaft joint at least partially enclosing a drive shaft end portion, wherein the drive shaft joint comprises a housing and a one-way clutch provided at an inner portion of said housing. The one-way clutch being arranged within said inner portion to engage with said drive shaft at a first drive shaft state, in which the drive shaft transfers torque from said drive shaft in a first direction; disengage from said drive shaft at a second drive shaft state, in which the drive shaft is idle or transfers torque in a second direction opposite to the first direction. The disclosure also relates to a vehicle comprising said drive shaft arrangement.

13 Claims, 6 Drawing Sheets

(51) Int. Cl.
*B60K 23/06* (2006.01)
*F16D 41/07* (2006.01)

(56) References Cited

U.S. PATENT DOCUMENTS

| | | | | |
|---|---|---|---|---|
| 5,927,456 | A | * | 7/1999 | Monahan .............. F16D 41/105 |
| | | | | 192/38 |
| 8,880,312 | B2 | * | 11/2014 | Joeng ................... F16D 48/066 |
| | | | | 701/68 |
| 11,415,184 | B2 | * | 8/2022 | Chen .................... F16D 27/112 |
| 2008/0210508 | A1 | * | 9/2008 | Heisey ................... F16D 28/00 |
| | | | | 180/274 |

* cited by examiner

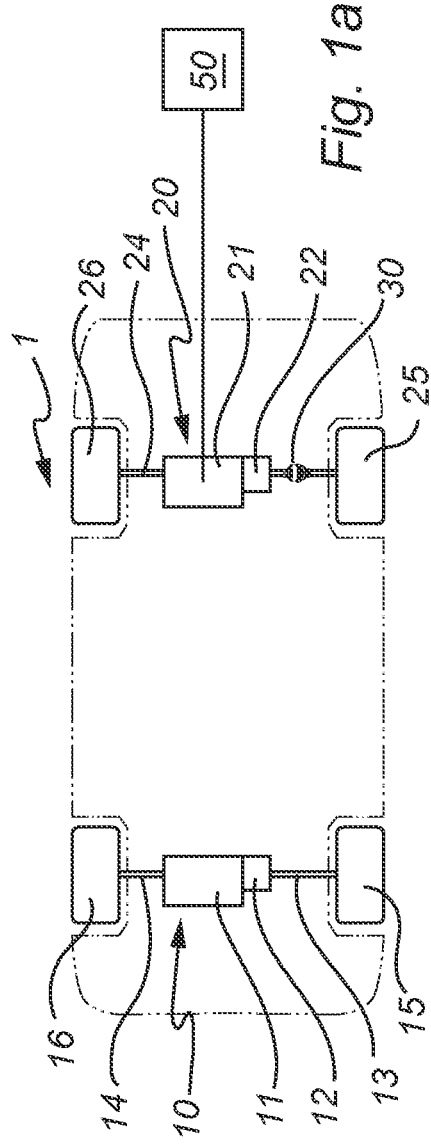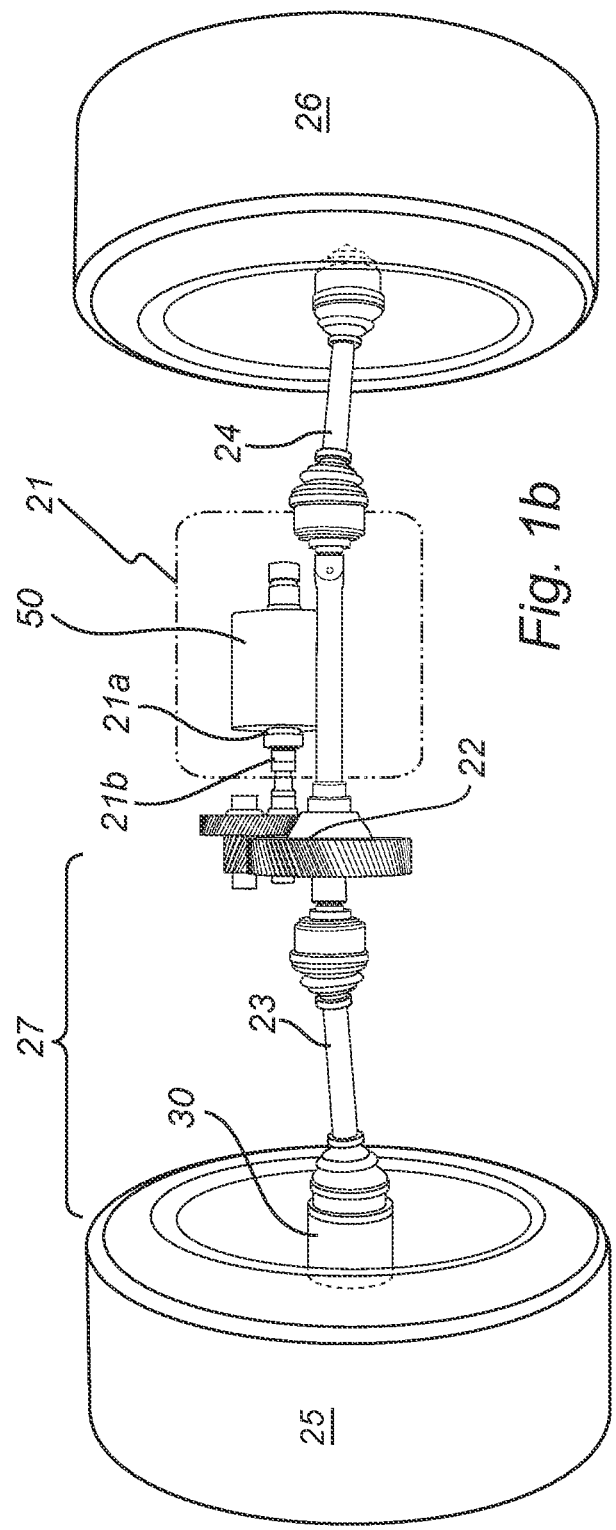

DRIVE SHAFT ARRANGEMENT AND A VEHICLE COMPRISING SAID ARRANGEMENT

CROSS-REFERENCES TO RELATED APPLICATIONS

This application claims priority to European Patent Application No., EP22206536.9, filed on Nov. 10, 2022, the disclosure of which is herein incorporated by reference in its entirety for all purposes.

TECHNICAL FIELD

The present disclosure relates to a drive shaft arrangement for transferring torque. The disclosure also relates to a vehicle comprising such a drive shaft arrangement.

BACKGROUND OF THE INVENTION

Particularly in passenger vehicles, as in all-wheel drive, AWD or four-wheel drive vehicles, 4WD, there has traditionally been a distribution of the drive torque from an internal combustion engine between a driven main drive axle and a further drive axle. The further drive axle may permanently have been in use, permanently providing an all-wheel drive functionality. Alternatively, the further drive axle may have been a manually or automatically selectable drive axle.

In recent years, electric motors such, for instance rear axle drive arrangements, ERAD, has been provided on a further drive axle of a vehicle, which has been applicable both in electric and hybrid vehicle applications for providing an electrical all-wheel drive functionality.

By means of an electric motor arranged to a further drive axle, it is also possible to variably control said further drive axle in different operating situations. However, for different reasons it is desirable and possible to disconnect said further drive axle. For example, when there is no need of all-wheel drive propulsion or traction force. By disconnecting one wheel axle, the affected axle propulsion system may be completely shut down to save energy for obtaining longer driving ranges. Then the vehicle wheels may be freewheeling, travelling in the vehicle speed without being powered.

If the electric machine and the transmission are rotated with the wheels it leads to losses such as friction and electromagnetic losses. For that reason, there are decoupling mechanisms to cause a power propulsion separation at one connection to the further drive axle. But there is still a need for improvements for further saving energy and to increase driving ranges.

BRIEF SUMMARY OF THE INVENTION

It is an object of the present invention to provide an improved solution that alleviates the mentioned drawbacks of present solutions. A first object of the invention is to provide an improved drive shaft arrangement, which may provide improved efficiency, minimizing energy losses and an increased driving range. This object is solved by the invention according to claim 1. A second object of the invention is to provide a drive shaft arrangement not affecting the interface to the surrounding components and systems. This object is solved by the invention according to claim 1. A third object is to provide a vehicle comprising implementing said drive shaft arrangement in a cost-efficient way. This object is solved by the invention according to claim 13. Preferred embodiments are specified in the dependent claims and further specified in the following.

According to a first aspect of the invention, a drive shaft arrangement for a vehicle, comprising a drive shaft arranged to transfer torque, a drive shaft joint at least partially enclosing a drive shaft end portion, wherein the drive shaft joint comprises a housing and a one-way clutch provided at an inner portion of said housing, the one-way clutch being arranged within said inner portion: to engage with said drive shaft in a first drive shaft state, in which the drive shaft is adapted to transfer torque in a first direction; and adapted to disengage from said drive shaft in a second drive shaft state, in which the drive shaft is idle or transfers torque in a second direction opposite to the first direction.

By the drive shaft arrangement, the wheel(s) of an drive axle of a vehicle implementing said arrangement may be driven by an electric machine in a first state when the one-way clutch is engaged. In the second state, the one-way clutch is disengaged and the wheel (s) may be rolling at the vehicle speed. Advantageously, the arrangement may be controlled in certain driving situations, which may lead to longer driving ranges.

According to one embodiment, the housing comprises an interior space having an interior circumferential surface comprising the inner portion. By the housing, the one-way clutch is provided at an inner portion of said housing. Advantageously, by means of the housing torque may be transferred from the drive shaft to the wheel via the drive shaft joint provided inside the housing. Alternatively, by means of the housing, torque may be transferred directly from the electric machine and the differential and transmission arrangement to the drive shaft via the drive shaft joint provided inside the housing and thereafter further to the wheel. The outer shell of the housing may be substantially cylindrical. The housing may have a interior side surface arranged in parallel to the axial direction of said housing. The inner portion may be provided in said side surface. The housing may have an interior rear end surface, which may be arranged in the radial direction of the housing with respect to the geometrical rotation axis of the housing. Said rear end surface may be provided in the vicinity of the connections to a wheel. Alternatively, said rear end surface may be provided in connection to the electric machine and the transmission and the differential arrangement arranged therein. The interior circumferential surface comprises said side surface and the rear end surface.

According to one embodiment, an outer race of the one-way clutch is fixedly provided into the inner portion of the housing and an inner race of the one-way clutch is disengagedbly provided in connection to the draft shaft joint. Advantageously, said outer race may be manufactured integrated in said inner portion of the housing. Preferably, the drive shaft joint may be provided inside the inner race of the one-way clutch into said housing. The inner race may then surround the drive shaft joint. The inner race may at least partly be substantially concentrically provided in relation to the drive shaft joint. Advantageously, the inner race may then be disengageably provided from the drive shaft joint at least partially arranged inside the surrounding inner race of the one way clutch.

According to one embodiment, the inner race of the one-way clutch is connectable with the drive shaft in the first state in a first rotation direction of the one-way clutch for transferring torque from the drive shaft via said drive shaft joint, and disconnectable from the drive shaft joint in the second state wherein the one-way clutch is non-rotatable. The first rotation direction may be counterclockwise or anticlockwise. Advantageously, the inner race may be connected to the drive shaft joint when the inner race obtains the same rotational speed as the outer race. In the opposite thereof, the inner race may be disengaged from the drive shaft joint when the rotational speed of the inner race is lower than the rotational speed of the outer race.

According to one embodiment, the inner race at least partly surrounds the drive shaft joint located inside the housing. The inner race and the drive shaft joint may be at least partly concentrically arranged to each other provided inside the housing. The inner race may be connectable to the drive shaft joint in the substantially radial direction with respect to a rotation axis running in the centre of the drive shaft joint provided into the housing.

According to one embodiment, bearings are provided to the inner race of the one-way clutch so that said one-way clutch is rotatable in one direction thereof, and non-rotatable in the opposite direction. The bearings may be asymmetrical bearings, sprag bearings or the like. By the characteristics of the asymmetrical bearings, sprag bearings or the like, which may be provided on the circumference of the inner race of the one-way clutch, said rotation capability is provided.

According to one embodiment, at least one first bearing arrangement is provided into the interior circumferential surface of the housing adjacent the one-way clutch. The bearing arrangement may be a ball bearing arrangement. By said bearing arrangement, substantially radial forces from the drive shaft may be supported with respect to the rotation axis of the housing. The at least first ball bearing may be at least substantially concentrically arranged to the drive shaft joint.

According to one embodiment, at least one second bearing arrangement is provided adjacent the rear interior end surface of the interior space of the housing. By means the bearing arrangement radial peripheral and axial forces with respect to the rotation axis of the housing from the drive shaft may be supported.

According to one embodiment, said drive shaft arrangement in the first state is adapted to be drivable by an electric machine via a differential and transmission arrangement of a vehicle, and in the second state to disengage the drive shaft joint and the drive shaft arranged in connection thereto. Advantageously, said drive shaft arrangement provides a freewheeling capability. By the drive shaft arrangement, it may be implemented into a vehicle without redesigning the components and systems interacting with said drive shaft arrangement.

According to one embodiment, the drive shaft joint at least partially enclosing a drive shaft end portion is movably provided inside the interior space of said housing. By the housing, a regular required operation capacity of the drive shaft may be provided.

According to one embodiment, wherein an insulation is provided adjacent from the end of the drive shaft to next to an outer edge of the housing. The insulation may be constituted of a rubber material. Advantageously, the insulation may be a rubber bellow. By means of the insulation, the interior space of the housing is protected against dirt, dust, chemical substances, etcetera.

According to one embodiment, wherein the housing is in one end adapted to be provided in connection to a wheel and in the other end provided in connection to the drive shaft. By means of the housing, torque may be transferred from the electric machine and the differential to the drive shaft joint via the drive shaft and thereafter further to a wheel.

According to one embodiment, the housing is provided with a projecting axle having attachment connections adapted to receive an interface of a wheel. The attachment connections may be a wheel suspension, wheel hub splines, etcetera.

According to one embodiment, wherein the housing is one end provided directly in connection to the differential and transmission arrangement and to the electric machine, and in its other end connected to the drive shaft. By means of the housing, torque may be transferred from the electric machine and the differential and transmission arrangement to the drive shaft arrangement via the drive shaft joint and thereafter further to a wheel.

According to a second aspect of the invention, a vehicle comprising at least one drive shaft arrangement as described above is provided. Advantageously, the vehicle further may comprise a second drive shaft, a first wheel and a second wheel, so that in a first state the first drive shaft arrangement may be drivable by the first wheel and the second drive shaft arrangement may be drivable by the second wheel, and that the drive shaft arrangement in the second state may be adapted to be non-rotatable while a first wheel provided in connection thereto may be adapted to roll at vehicle speed, and the second drive shaft may be adapted to be rotatable in the opposite direction vehicle speed by means of a bevel gear arrangement of a differential and transmission arrangement as the second wheel provided in connection thereto may roll at the vehicle speed. By the described drive train arrangement, only one drive shaft arrangement per wheel axle, and into a vehicle, may be implemented without redesigning the components and systems interacting with said drive shaft arrangement. Advantageously, the number of redesigned components implemented in the vehicle may be minimised, which decreases the costs.

Alternatively, a wheel axle in a vehicle may be provided with two drive shafts arrangements. Then the drive shafts of said wheel axle may rotate together with the wheels during both freewheeling and when the wheels are drivable by the electric machine. Alternatively, the drive shaft arrangement is implemented in a vehicle having at least three wheel axles or more, for instance in a truck, a lorry, etcetera. Then at least one drive shaft arrangement may be implemented per wheel axle onto at least one or several wheel axles of said truck, lorry or of a vehicle having at least three wheel axles.

BRIEF DESCRIPTION OF THE DRAWINGS

The invention will in the following be described in more detail with reference to the enclosed drawings, wherein:

FIG. 1a shows an overview of a drive train of a vehicle,

FIG. 1b shows a sketch of the rear axle of a vehicle,

DESCRIPTION OF THE EMBODIMENTS

Figure 2A:
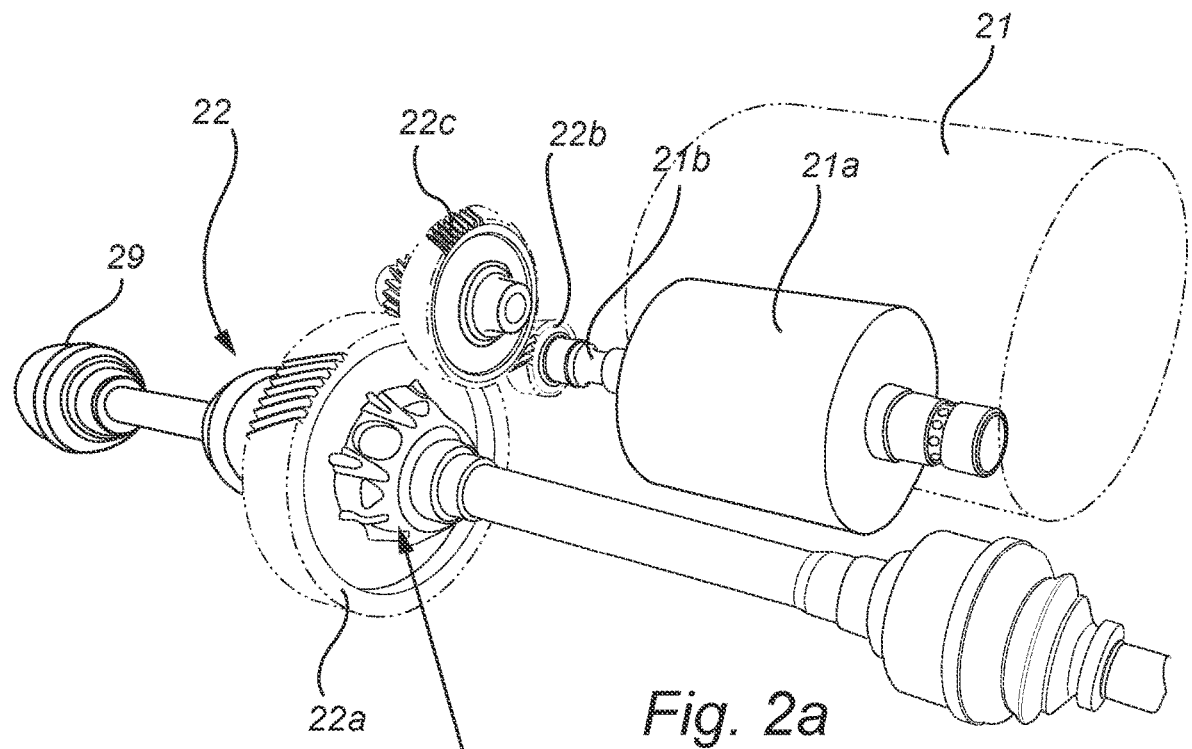
FIG. 2a shows a perspective view of a differential and transmission arrangement between a electric machine and the rear axle.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

In FIG. 1a shows an overview of a drive train of an electrically operated motor vehicle 1 which is provided with an electrically drivable front axle 10 and an electrically drivable rear axle 20, respectively. The front axle 10 is provided with at least one electric machine 11, which in turn is connected to a left and a right front drive shafts 13, 14 via a front differential and transmission arrangement 12. The left and right front drive shafts 13, 14 are further connected with the right and left front wheels 15, 16, respectively.

The rear axle 20 is provided with at least one electric machine 21 for driving said rear axle 20, which is connected to the left rear and right rear drive shafts 23, 24, respectively, via a rear differential and transmission arrangement 22, see FIG. 1b. The at least one electric machine 21 is capable of providing a variable control of the left rear and right rear drive shafts 23, 24 and is controllable by a control unit 50.

In FIG. 1b, it is shown that the left drive shaft 23 is connected to the left rear wheel 25 via a freewheeling axle 27 according to the disclosure; meaning that the drive shaft 23 is adapted to be disconnected from another drive axle for freewheeling without being drivable by the electric machine 21. The freewheeling axle 27 is in the following referred to as a drive shaft arrangement 27. The drive shaft arrangement 27 comprises said left rear drive shaft 23 and a disconnecting or disengaging unit 30. The right rear drive shaft 24 is further connected to the right rear wheel 26 via the differential and transmission arrangement 22 as well. However, the drive shaft arrangement 27 may be arranged in a number of different ways at front or rear wheel axles of different vehicle applications.

The differential arrangement and the transmission arrangement 22 are connected between the left rear and the right rear drive shafts 23, 24 and is configured to transfer power propulsion in the following way, see FIG. 2a. When the electric machine 21 is interrupted, and is not in operation, the rotor 21a of the electric machine 21 is standing still and is thus not rotating. Then the rotor axis 21b and a gear 22b positioned thereon are standing still and are not rotating. The complete differential and transmission arrangement 22, which is engageable coupled thereto is thereby also standing still. Consequently, the left and right rear drive shafts 23, 24 are not drivable by the electric machine 21 when it is not in operation since there is no power transferred from the electric machine 21 to the drive shafts 23, 24. In opposite thereto, if the electric machine 21 is in operation, the rotor 21a of the electric machine 21 is rotating around its own axle 21b. Then the gear 22b positioned thereon is rotating around said axle 21b and the complete differential arrangement 22 engaged thereto is rotating as well. Accordingly, power propulsion is then transferred from the rear electric machine 21 to the left and right rear drive shafts 23, 24 so that said drive shafts 23, 24 are drivable and rotatable when the electric machine 21 is in operation.

Figure 2B:
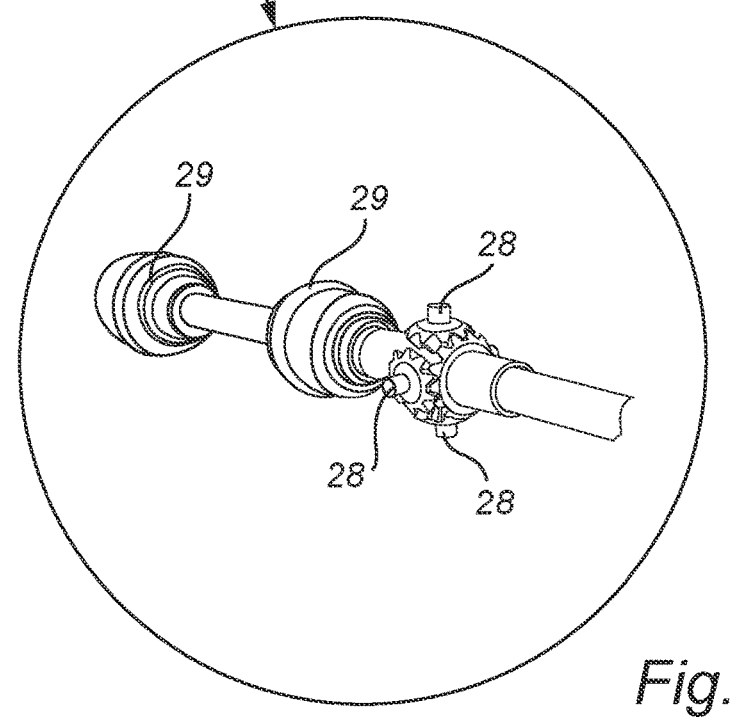
FIG. 2b shows a perspective view of a bevel gear arrangement of the differential arrangement between a electric machine and the rear axle.

In FIG. 2b an interior part of the differential arrangement 22 is shown without the outer gears as shown in FIG. 2a. Thus, the differential and transmission arrangement 22 further comprises a bevel gear arrangement 28 arranged in connection thereto. When the electric machine 21 is not in operation the wheels 25, 26 are adapted to freewheel in vehicle speed, and the differential and transmission arrangement 22 is standing still, the bevel gear arrangement 28 is adapted provide that the right rear drive shaft 24 is to be rotated at vehicle speed together with the right rear wheel 26 at the same time as the left rear drive shaft 23 is adapted to rotate in same vehicle speed but in the opposite direction, see FIGS. 1a and 1b, which is also to be described in the following. Furthermore, there are output gears 29 provided in connection to the drive shafts 23, 24, which are adapted to rotate with the left and the right wheels 25, 26 in different configurations as the operation of the electric machine 21 is stopped.

Figure 3A:
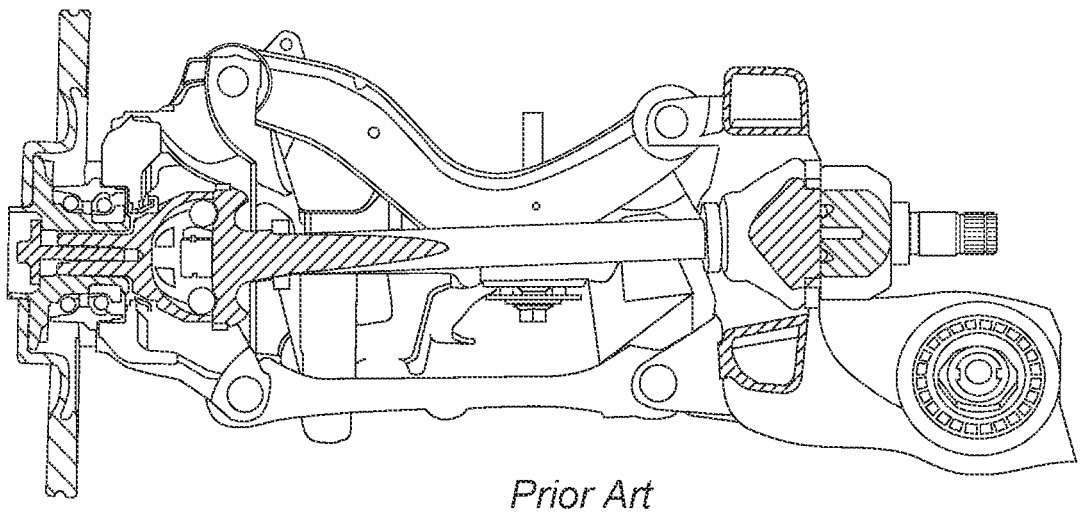
FIG. 3a shows a drive shaft arrangement according to prior art.
Figure 3B:
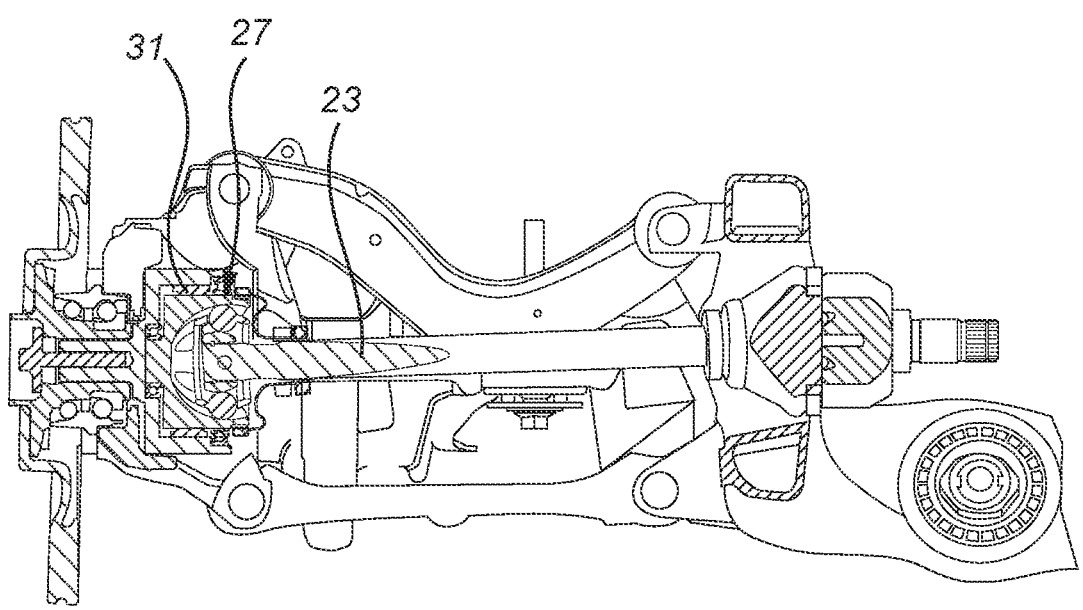
FIG. 3b shows one embodiment of a drive shaft arrangement according to the disclosure.
Figure 4A:
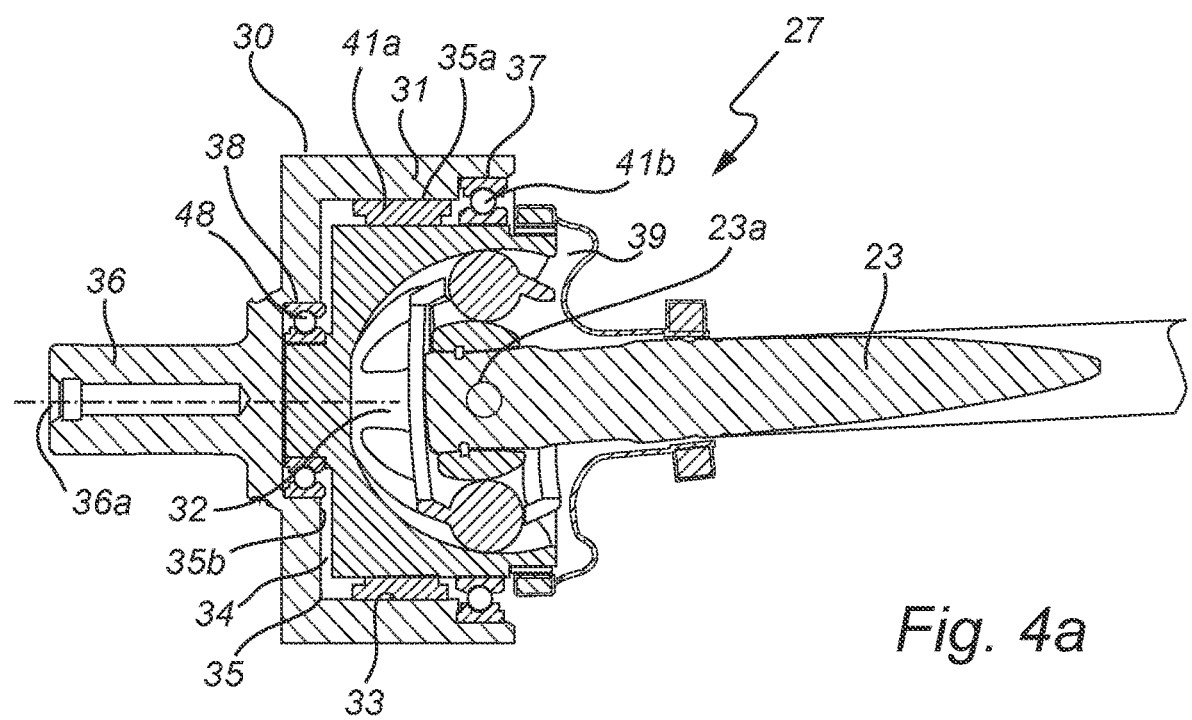
FIG. 4a shows one embodiment of a disconnecting unit according to the disclosure.

In FIG. 3a a drive shaft arrangement according to prior art is shown, and in FIG. 3b a drive shaft arrangement 27 according to the disclosure is revealed. As is shown, the drive shaft joint 32 is enclosed in a housing 31, which is now to be described in further detail with reference to FIG. 4a. Hereinafter, the disconnecting or disengaging unit 30 according to the disclosure is to be described, which is referred to as a drive joint unit 30 according to the disclosure, see FIG. 4a and a second embodiment in FIG. 4c. The composed drive joint unit 30 comprises a housing 31, 131 provided with a drive shaft joint 32, 132 and at least a clutch device, which is preferably a one-way clutch arrangement 41a, 141a which is to be described in more detail below. According to known art, the drive shaft 23 is connected to the drive shaft joint 32, 132 for transmitting power by means of a variable angle to the wheel 25 for minimising the energy losses and to provide wheel articulation. The housing 31, 131 has a hollow interior space 34 for providing the drive shaft joint 32 and the end of the drive shaft 23 movable therein. The interior space 34, 134 of the housing 31, 131 has a surrounding circumferential surface 35, 135. In one embodiment, the surrounding circumferential surface 35, 135 of the interior space 34, 134 may be substantially cylindrical. Said interior surrounding circumferential surface 35, 135 comprises preferably a side surface 35a, 135a being substantially parallel to the axial direction of the housing 31, 131. Said side surface 35a, 135a may comprise the inner portion 33, 133. The interior circumferential surrounding surface 35, 135 may comprise an interior rear end surface 35b, 135b substantially in the radial direction of the housing 31 with respect to a geometrical rotation axis of the housing 31. A rubber bellow 39, 139 is further provided adjacent to the end of the drive shaft 23 and the outer edge 35a, 135a of the housing 31, 131 for providing insulation against dirt, dust, etcetera. In the embodiment shown in FIG. 4.a the housing 31, 131 may in its external other end be provided with a protruding axle 36, which in turn may be provided with a number of attachment connections 36a for receiving the wheel 25, wheel splines, etcetera.

Figure 4B:
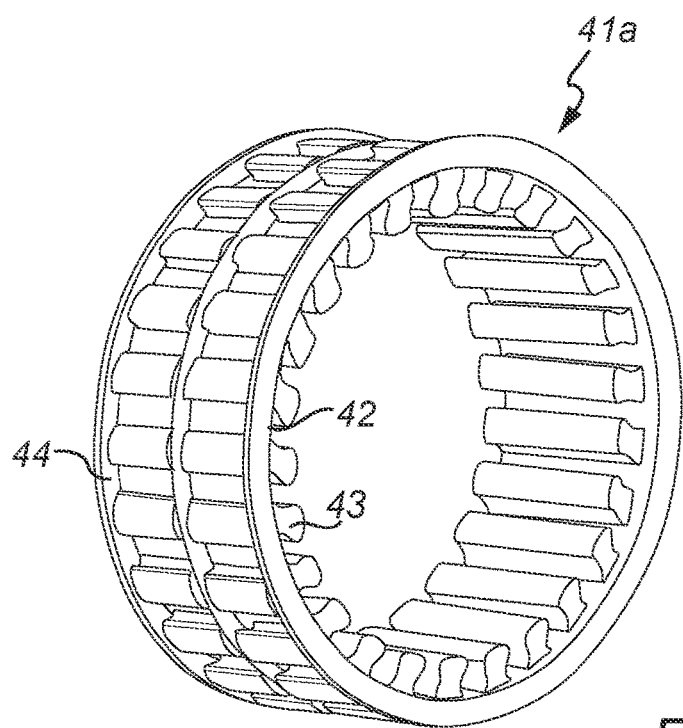
FIG. 4b shows one embodiment of a one-way clutch arrangement according to the disclosure.
Figure 4C:
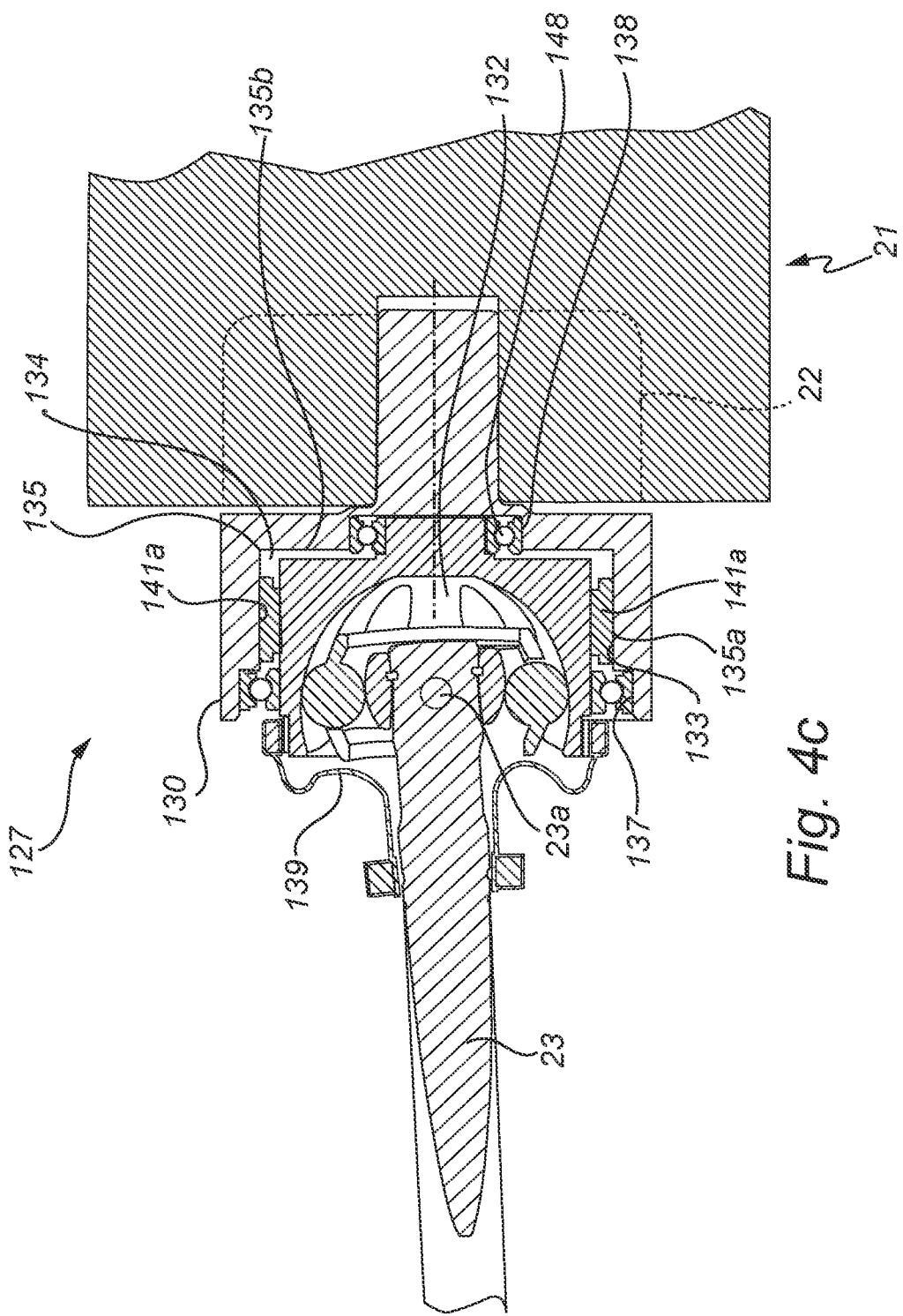
FIG. 4c shows a second embodiment of a disconnecting unit according to the disclosure.

In FIG. 4b, the one-way clutch 41a being shown is a typical one-way clutch 41a comprising bearing elements 43, allowing rotation in one direction for connecting the drive shaft joint 32, 132 and thereby the drive shaft 23 in connection thereto. Said bearing elements 43 do not allow rotation in the opposite direction and thereby disconnecting the drive shaft joint 32, 132 as an inner race 42 is then standing still. The one-way clutch 41*a* may be of a sprag type 43.

The one-way clutch 41*a* is provided inside the housing 31, 131 between an inner portion 33, 133 of the surrounding circumferential surface 35, 135 of the interior space 34, 134 and the drive shaft joint 32, 132. Preferably, an outer circular race 44 of the one-way clutch 41*a* is integrated and fixed provided into the inner portion 33, 133 of the housing 31, 131. The inner race 42 of the one-way clutch 41*a*, 141*a* is then provided disengagably connected to the drive shaft joint 32, 132 and thereby to the drive shaft 23. The inner race 42 at least partly surrounds the drive shaft joint 32, 132 inside the housing 31, 131 when the said drive shaft joint 32, 132 is located into said inner race 42. Then the inner race 42 of the one-way clutch 41*a*, 141 and the drive shaft joint 32, 132 may be at least partly concentrically arranged to each other provided inside the housing 31, 131. In that way, the inner race 42 is connectable to the drive shaft joint 32, 132 in the substantially radial direction with respect to a rotation axis running in the centre of the drive shaft joint 32, 132 provided into the housing 31, 131.

Inside the housing 31, 131, the one-way clutch 41*a*. 141*a* is in a first rotation direction adapted to transmit torque from the drive shaft 23 via the drive shaft joint 32, 132 and further to the wheel 25. In the opposite rotation direction, the inner race 42 is not rotatable inside the housing 31, 131 whereby the one-way clutch 41*a*, 141*a* is disconnected from the drive shaft joint 32, 132 and is thereby not able to transmit torque from the drive shaft 23 to the drive shaft joint 32, 132 and further to the wheel 25. Then the wheel 25 is not drivable by the electric machine 21, instead the vehicle 1 is drivable by the front electric machine 11 only, and the left and right rear wheels 25, 26 are adapted to be rotating at vehicle speed, i.e., freewheeling.

In even greater detail, when the speed of the propulsion unit is lower than the wheel speed or completely stopped, the right rear drive shaft 24 in connection to the right rear wheel 26 is adapted to continue to rotate together with said wheel 26. The drive shaft arrangement 27, 127 comprising the one-way clutch 41*a*. 141*a* is then adapted to disconnect the transfer of torque via the drive shaft joint 32, 132 to the left rear wheel 25, whereby said wheel 25 rotates in vehicle speed. In case of a completely stopped electric machine 21, by means of said bevel arrangement 28, the left rear drive shaft 23 is then adapted to rotate with the same speed as the right rear drive shaft 24 but in the opposite direction. Furthermore, at least one first bearing arrangement 41*b*. 141*b* is provided into the interior surface 35, 135 of the housing 31, 131 for bearing against the drive shaft joint 32, 132 and against the substantially radial forces thereof with respect to a rotation axis of the housing 31, 131. The housing 31, 131 may be further provided with at least one recess or heel 37, 137 into the internal surrounding surface 35, 135 thereof, preferably in the vicinity of the inner portion 33, 133. Said at least first bearing arrangement 41*b*, 141*b* may be provided in said recess 37, 137. At least one second bearing arrangement 34, 148 may also be provided into said interior surface 35, 135 of the housing 31, 131 for bearing against the drive shaft joint 32, 132 and against substantially radial, peripheral and axial forces thereof with respect to a geometrical rotation axis of the housing 31, 131. The housing 31, 131 may be further provided with at least a second recess or heel 38, 138 into the surrounding surface 35, 135 in the vicinity of the rear interior end 35*b* of the interior space 34. Said at least second bearing arrangement 48, 148 may be provided into said at least second recess 38, 138.

In FIG. 4 *c* a second embodiment of the housing 131 is shown, which may be provided in connection to the electric machine 21 and the differential and the transmission arrangement 22, for transferring torque to the drive shaft 23 via the drive shaft joint 132 in the housing 131, and thereafter further to the wheel 24. Except for a difference in design, the second embodiment works in the corresponding way.

Figure 5:
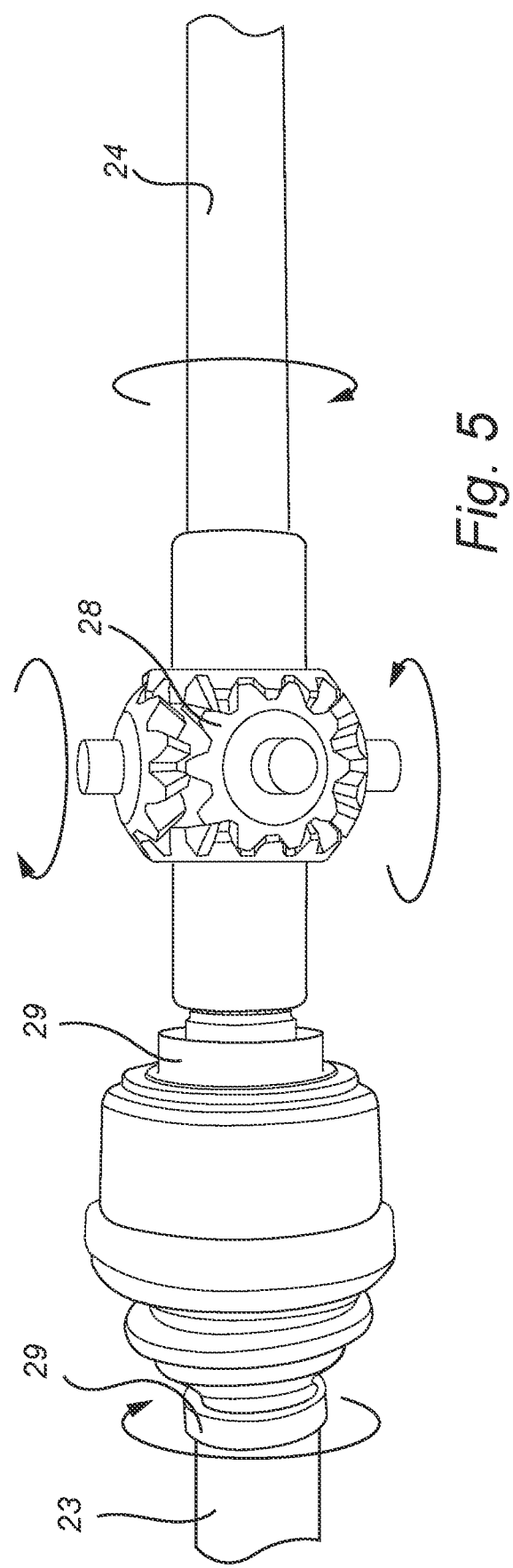
FIG. 5 shows one rotation direction of the drive train comprising the embodiment in FIG. 4a of the drive shaft arrangement according to the disclosure.

The drive shaft arrangement 27, 27 according to the disclosure works in the following way. In an ongoing driving operation by the vehicle 1 and the rear axle 20, wherein there is no traction torque or power propulsion required by the rear axle 20, the control unit 50 sends a signal to interrupt the operation of the rear electric machine 21. Then the electric machine 21 interrupts its operation and the rotor 21*a* thereby stands still, and does not rotate. As previously described, the power propulsion of the rear axle 20, and thereby the left and right rear drive shafts 23, 24, takes place via the rear differential and transmission arrangement 22 so that when the rotor 21*a* of the electric machine 21 stands still, and the time as the speed of the propulsion unit is lower than the wheel speed or completely stopped, the right rear drive shaft 24 in connection to the right rear wheel 26 continues to rotate together with said right rear wheel 26. The drive shaft arrangement 27, 127 comprising the one-way clutch 41*a*, 141*a* then disconnects the transfer of torque via the drive shaft joint 32, 132 to the left rear wheel 25, whereby said wheels 25, 26 rotate in vehicle speed. In the case of a completely stopped electric machine 21, by means of said bevel arrangement 28 the left rear drive shaft 23 is then adapted to rotate with the same vehicle speed as the right rear drive shaft 24, and the freewheeling wheels 25, 26, but in the opposite direction, see FIG. 5.

The output gears 29 arranged onto the left and right rear drive shafts 23, 24 then rotate at the vehicle speed, disengaged from the rotation of said left and right rear drive shafts 23, 24.

Accordingly, the vehicle 1 is only driven by the front electric machine 12 and only transfers torque to the front axle 10 in a two-wheel drive operation.

By disconnecting the rear axle 20, the power propulsion of the rear axle 20 is completely shut down with the object to reduce drag losses, electromagnetic losses and and thereby to save energy for obtaining longer driving ranges and e.g. to improve the powering of other auxiliary systems.

In the opposite scenario, if there is a need for traction torque, power propulsion and/or all-wheel drive operation during driving when the rear electric machine 21 is not in operation, the control unit 50 sends a signal to start the rear electric machine 21. Then the rear electric machine 21 starts its operation and the rotor 21*a* starts to rotate. As previously described, the power propulsion of the rear axle 20 and thereby the left and right rear drive shafts 23, 24 take place via the rear differential and transmission arrangement 22, whereby the left and right rear drive shafts 23, 24 starts to rotate as well. Then the inner race 42 connects with said drive shaft joint 32, 132 when the inner race 42 obtains the same rotational speed as the outer race 44 of the one-clutch inside the housing, whereby the left rear drive shaft 23 transfers torque to the left rear wheel 25 via said drive shaft joint 32 as described above. The electric machine 21 now drives the left rear wheel 25 via the drive shaft arrangement 27, 127 according to the disclosure. Simultaneously, the right rear drive shaft 24 drives the right rear wheel 26. In this way, both the rear drive shafts 23, 24 drives the rear wheels 25, 26 when the electric machine 21 is in operation.

Accordingly, during driving the vehicle 1 having both the front electric machine 11 and rear electric machine 21 powering the front axle 10 and the left and the right rear drive shafts 23, 24, respectively, and thereby the left and right rear wheels 25, 26. By connecting the rear axle 20, the electric vehicle 1 provides an improved capability to provide traction torque and power propulsion, but also to provide all-wheel drive functionality.

There are driving situations during which there may be very advantageous to temporarily disconnect one drive axle, e.g., in a downward slope when the vehicle 1 is driven faster by its wheels 15, 16, 25, 26 than by the electric machines 11, 21. There are other known driving operations wherein this may be utilized as well, which are not to be described hereinafter.

In one embodiment, the drive shaft arrangement 27, 127, or the freewheeling axle 27, 127, may be implemented in a corresponding way onto a front rear axle 10 of a vehicle 1. In one embodiment, the drive shaft arrangement 27, 127 may be provided to a right wheel 16, 26 of a front 10 or a rear axle 20 of a vehicle 1. In a further embodiment, in case of a vehicle 1 having at least three wheel axles, for instance a truck a lorry, etcetera, the drive shaft arrangement 27, 127 may be implemented onto one or several wheel axles. In one embodiment, the drive shaft arrangement 27 may advantageously be implemented in an ICE and/or in hybrid vehicle. Furthermore, the second embodiment of the housing 131 may be provided in any of these applications as well and operates in the corresponding way.

In the drawings and specification, there have been disclosed preferred embodiments and examples of the invention and, although specific terms are employed, they are used in a generic and descriptive sense only and not for the purpose of limitation, the scope of the invention being set forth in the following claims.

What is claimed is:

1. A drive shaft arrangement for a vehicle, comprising:
a drive shaft arranged to transfer torque; and
a drive shaft joint at least partially enclosing a drive shaft end portion,
wherein the drive shaft joint comprises a housing and a one-way clutch provided at an inner portion of said housing,
the one-way clutch is arranged within said inner portion such that the one-way clutch:
engages with said drive shaft in a first drive shaft state, in which the drive shaft is adapted to transfer torque in a first direction, and
is adapted to disengage from said drive shaft in a second drive shaft state, in which the drive shaft is idle or transfers torque in a second direction opposite to the first direction, wherein an outer race of the one-way clutch is fixedly provided into the inner portion of the housing and an inner race of the one-way clutch is disengageably provided in connection to the drive shaft joint, wherein the inner race at least partly surrounds the drive shaft joint located inside the housing.

2. The drive shaft arrangement according to claim 1, wherein the housing comprises an interior space having an interior circumferential surface comprising the inner portion.

3. The drive shaft arrangement according to claim 2, wherein at least a first bearing arrangement is provided into the interior circumferential surface of the housing adjacent the one-way clutch.

4. The drive shaft arrangement according to claim 3, wherein at least a second bearing arrangement is provided adjacent a rear interior end surface of the interior space of the housing.

5. The drive shaft arrangement according to claim 2, wherein the drive shaft joint at least partially enclosing the drive shaft end portion is movably provided inside the interior space of said housing.

6. The drive shaft arrangement according to claim 1, wherein the inner race of the one-way clutch is connectable with the drive shaft in the first drive shaft state in the first direction defined as a first rotation direction of the one-way clutch for transferring torque from the drive shaft via said drive shaft joint, and disconnectable from the drive shaft joint in the second drive shaft state wherein the one-way clutch is non-rotatable.

7. The drive shaft arrangement according to claim 1, wherein bearings are provided to the inner race of the one-way clutch so that said one-way clutch is rotatable in the first direction, and non-rotatable in the second opposite direction.

8. The drive shaft arrangement according to claim 1, wherein said drive shaft arrangement in the first drive shaft state is adapted to be drivable by an electric machine via a differential and transmission arrangement of the vehicle, and in the second drive shaft state to disengage the drive shaft joint and the drive shaft arranged in connection thereto, wherein disengaging the drive shaft joint and the drive shaft comprises disabling the one-way clutch from transmitting torque from the drive shaft to the drive shaft joint and further to a wheel.

9. The drive shaft arrangement according to claim 1, wherein an insulation is provided adjacent from the drive shaft end portion next to an outer edge of the housing.

10. The drive shaft arrangement according to claim 1, wherein the housing is in one end adapted to be provided in connection to an interface of a wheel and in another end provided in connection to the drive shaft.

11. The drive shaft arrangement according to claim 1, wherein the housing is provided with a projecting axle having attachment connections adapted to receive an interface of a wheel.

12. The drive shaft arrangement according to claim 1, wherein the housing is in one end adapted to be provided in connection to a differential and transmission arrangement and further to an electric machine, and in another end provided in connection to the drive shaft to transfer torque from the electric machine and the differential and the transmission arrangement to the drive shaft via the drive shaft joint and thereafter further to a wheel.

13. A vehicle comprising the drive shaft arrangement as claimed in claim 1.

* * * * *